US010795410B2

(12) United States Patent
Sullivan

(10) Patent No.: US 10,795,410 B2
(45) Date of Patent: Oct. 6, 2020

(54) SYSTEM FOR AUTO-SECURING VIRTUAL REALITY HEADGEAR

(71) Applicant: Scott Sullivan, San Francisco, CA (US)

(72) Inventor: Scott Sullivan, San Francisco, CA (US)

( * ) Notice: Subject to any disclaimer, the term of this patent is extended or adjusted under 35 U.S.C. 154(b) by 238 days.

(21) Appl. No.: 15/960,554

(22) Filed: Apr. 24, 2018

(65) Prior Publication Data
US 2018/0364754 A1   Dec. 20, 2018

Related U.S. Application Data

(60) Provisional application No. 62/521,962, filed on Jun. 19, 2017.

(51) Int. Cl.
*G02B 27/01* (2006.01)
*G06F 1/16* (2006.01)
*A45F 5/00* (2006.01)

(52) U.S. Cl.
CPC .............. *G06F 1/163* (2013.01); *A45F 5/00* (2013.01); *G02B 27/0176* (2013.01); *A45F 2200/0525* (2013.01); *G02B 2027/0181* (2013.01)

(58) Field of Classification Search
CPC ..... A42B 3/08; A42B 3/06; A45F 5/00; G06F 1/163; G02B 27/0176
USPC ..................................................... 2/410, 425
See application file for complete search history.

(56) References Cited

U.S. PATENT DOCUMENTS

| | | | | |
|---|---|---|---|---|
| 7,841,026 B2 * | 11/2010 | Makris | ................. | A42B 3/0433 2/424 |
| 8,605,008 B1 * | 12/2013 | Prest | .................. | G02B 27/0176 345/7 |
| 2007/0000031 A1 * | 1/2007 | Makris | ................. | A42B 3/0433 2/411 |
| 2014/0098009 A1 * | 4/2014 | Prest | .................. | G02B 27/0176 345/8 |

\* cited by examiner

*Primary Examiner* — Gloria M Hale

(57) ABSTRACT

An automatic strap-tensioning system is provided for head-worn electronic gear including a microprocessor, a powered drive mechanism and sensors. In use, microprocessor reads the outputs of the sensors and, if prescribed conditions are met, instructs the drive mechanism to tension the straps of the headset. The sensors are used as feedback to control the level of tension in the straps.

20 Claims, 4 Drawing Sheets

SYSTEM FOR AUTO-SECURING VIRTUAL REALITY HEADGEAR

CLAIM OF PRIORITY

This application claims priority from U.S. Provisional Patent Application No. 62/521,962, filed Jun. 19, 2017, entitled: "System for Auto-Securing Virtual Reality Headgear," the contents of which are incorporated herein in their entirety.

BACKGROUND OF THE INVENTION a) Field of the Invention

The present invention relates to equipment used to generate virtual reality, and more particularly, to improvements of securement systems used to secure virtual reality headsets to a user's head.

b) Description of the Related Art

Various forms of head-mounted virtual reality devices have been developed between the 1950's and 2000, but limitations in both computational and display technologies of the time were incapable of providing any meaningful or convincing illusion into the "virtual world." These prior art virtual reality devices were also large, heavy, and too cumbersome to reside on a user's head for any useful period of time without the user experiencing fatigue and muscle strain.

It wasn't until the first 15 years of this century has rapid advancements in computing and display technologies been realized, allowing virtual reality to become cost effective and finally reach the price-conscious consumer. Computer processing speeds have increased and LED display screens have advanced to provide incredible resolution while using minimal power and generating minimal heat. Other supporting components and technologies have advanced as well, including GPS, accelerometers, and multi-axis gyros. The end result is that powerful, high-resolution, lightweight and relatively low-cost virtual reality headsets are now possible. Unfortunately, with all the technological advances seemingly applied to the immersive virtual experience, the relatively simple technology of fitting these VR headsets easily and comfortably onto a user's head appears to have been overlooked over the years. Such securement systems used on current VR headsets remain difficult and awkward to use, even on the most advanced units. Typically, these prior art headsets provide nothing more than simple rubber or woven-fabric straps, with various buckles, snaps, or Velcro®. The straps are formed to cradle around a user's head so that the VR display may be supported securely in front of the user's eyes, during use.

Applicant has recognized a need for a more effective method to secure a VR headset to a user's head. To this end, a first object of the present invention is to provide a system for securing virtual reality headgear to a user's head which overcomes the deficiencies of the prior art. Another object of the invention is to provide a headgear securement system which activates automatically in response to specific measured conditions.

SUMMARY OF THE INVENTION

An automatic strap-tensioning system is provided for head-worn electronic gear including a microprocessor, a powered drive-mechanism, and sensors. In use, microprocessor reads the outputs of the sensors and, if prescribed conditions are met, instructs the drive mechanism to automatically tension the straps of the headset about the user's head. The sensors are used as feedback to control the level of tension in the straps. The features of this invention, and the manner of attaining them, will become more apparent and the invention itself will be better understood by reference to the following description of the disclosed embodiments taken in conjunction with the accompanying drawings.

DETAILED DESCRIPTION OF THE PREFERRED EMBODIMENTS

Figure 1:
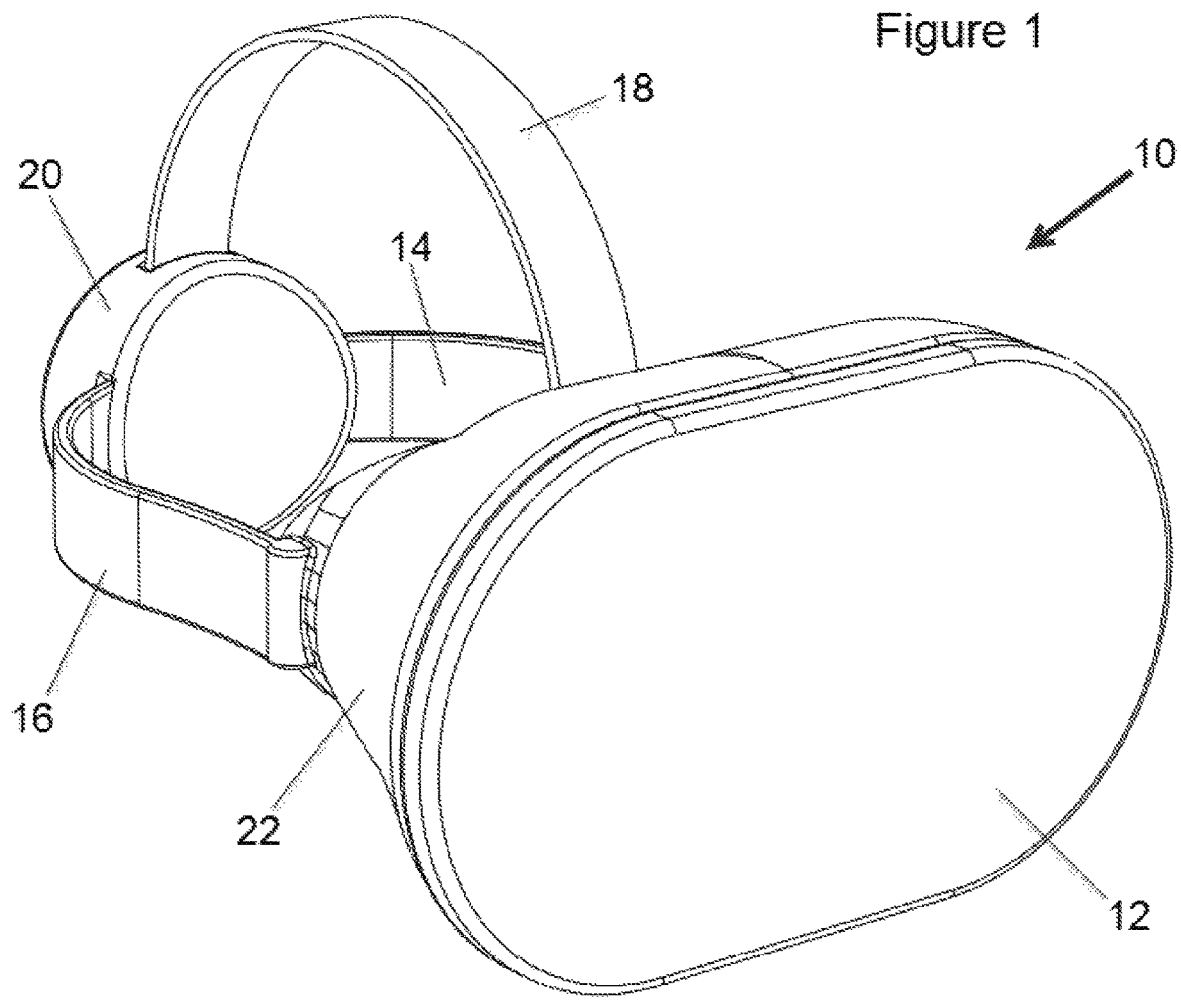
FIG. 1 is a perspective view of an exemplary virtual reality headset, showing straps, a VR display assembly, and a tensioning component, according to the present invention.
Figure 2:
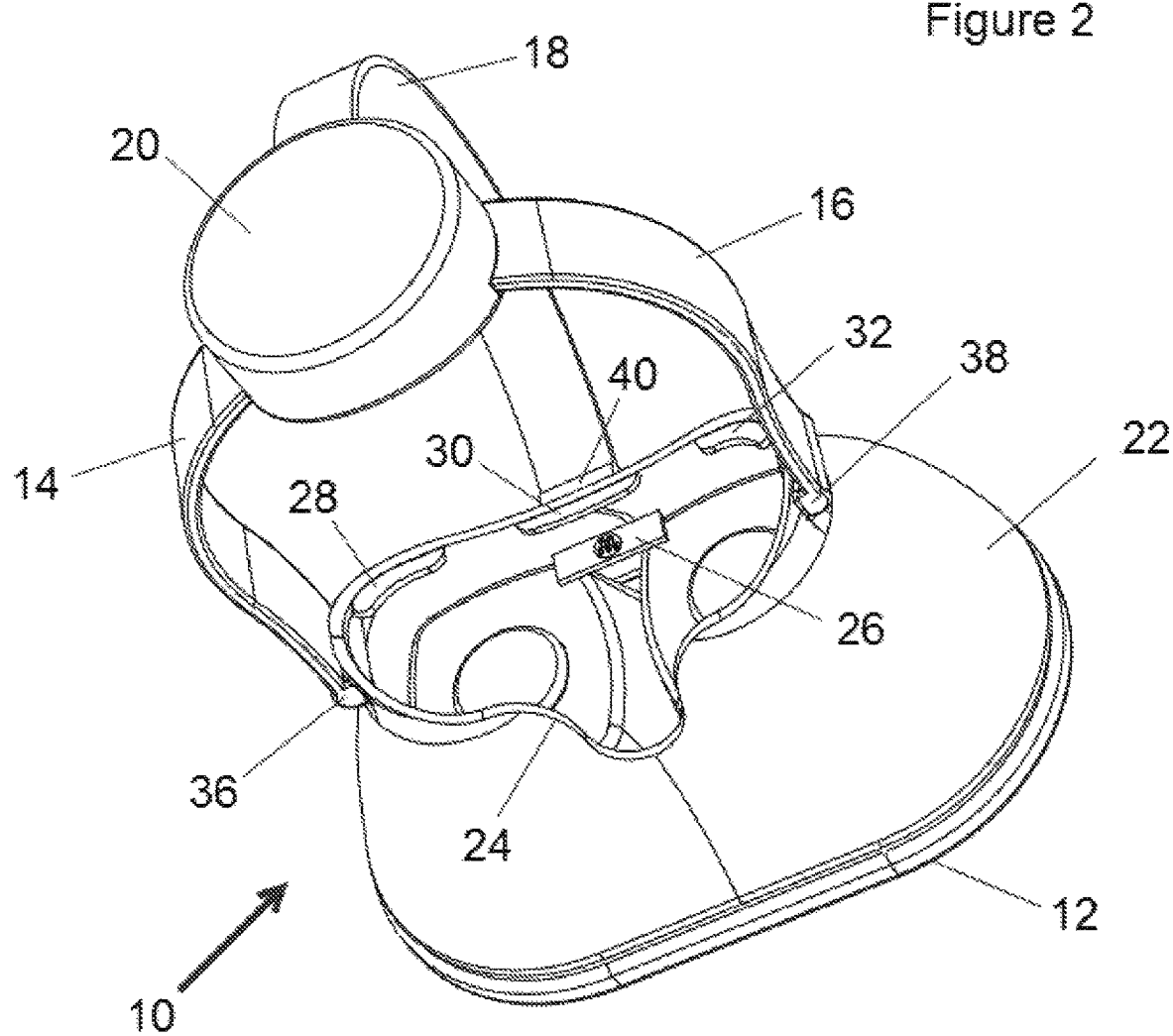
FIG. 2 is a lower perspective view of the exemplary virtual reality headset of FIG. 1, showing details of a photosensor and pressure sensors, according to the present invention.

By way of overview, the present invention is a system for automatically tensioning the straps of a headset assembly about a wearer's head. The invention is particularly suited to virtual reality headsets. According to the invention, the tensioning initiates in response to specific measured conditions. The exact mechanism used to provide the tension to the straps can be based on any of many known electromechanical mechanisms that provide mechanical torque and linear tension. The gist of this invention resides in the system which controls when the straps are tensioned. This is explained below. Referring to FIGS. 1 and 2, an exemplary VR headset 10 is shown, including a display assembly 12, a left strap 14, a right strap 16, an upper strap 18, a tensioning assembly 20, a shroud 22 having a rim 24, a photosensor 26, a left side pressure sensor 28, a central pressure sensor 30, and a right side pressure sensor 32. Display assembly 12 includes at least one display (not shown), two lenses 34a 34b, and controlling circuitry (not shown). Left side pressure sensor 28, central pressure sensor 30, and right side pressure sensor 32 are all positioned on shroud 22, preferably adjacent to rim 24. These pressure sensors are used to sense the pressure between the user's face and rim 24. The sensors will help the present tensioning system to determine how much tension is required, according to the user, as explained below.

Photo-sensor 26 is mounted within shroud 22, as shown in FIG. 2, and is used to detect light entering the shroud. If light is detected, then it is likely that shroud 22 of VR headset 10 is not against a user's face (i.e., it is not being worn), since light should only be able to enter past rim 24, if headset is not being worn. If photosensor 26 does not detect light, then it could mean that shroud 22 of VR headset 10 is against a user's face, so that ambient light is blocked from reaching within shroud 22, or it could mean that VR headset 10 is not being worn, but is located in a dark room. The present system will use the output of photosensor 26 to allow the controlling circuitry to make operational decisions, as described below.

According to the invention, a first end 36 of left strap 14 is secured to a portion of shroud 22 of display assembly 12, preferably adjacent to rim 24. The opposing end (not shown) of left strap 14 is located within tensioning assembly 20. Similarly, a first end 38 of right strap 16 is secured to a portion of shroud 22 of display assembly 12, preferably adjacent to rim 24. The opposing end (not shown) of right strap 16 is located within tensioning assembly 20. According to one embodiment, the opposing end of right strap 16 is connected to the opposing end of left strap 14. Upper strap 18 is preferably included to help support the weight of display assembly 12 and includes a first end 40 that is secured to a portion of shroud 22 of display assembly 12, preferably adjacent to rim 24, as shown in FIGS. 1 and 2. The opposing end (not shown) of upper strap 18 is located within tensioning assembly 20. Each strap may include any of many known mechanical adjustment systems, such as snaps, buckles, and Velcro® to allow the user to make rough size adjustments so that the left, right and upper straps may comfortably slip onto his or her head. Tensioning assembly 20 is meant to only provide final tightening to all straps to provide a snug fit on the user's head.

Tensioning assembly 20, as shown in FIGS. 1 and 2, includes an electro-motive device (not shown), such as a servo motor, a motor with a gear transmission, an electro-magnetic linear drive, a solenoid, or any appropriate powered drive mechanism that may selectively (when activated) provide sufficient tension to left, right and upper straps to effective secure VR headset to the user's head. The details of such a tensioning assembly 20 are beyond the scope of the present invention, but suffice to say that such technology is readily available and well within the abilities of one of ordinary skill in the art. For the purpose of the present invention, tensioning assembly 20 must quickly and effectively provide a predetermined amount of tension to the opposing ends of left strap 14, right strap 16, and upper strap 18, when instructed to do so by a microprocessor 42, which is shown in FIG. 3, and described in greater detail below.

Figure 4:
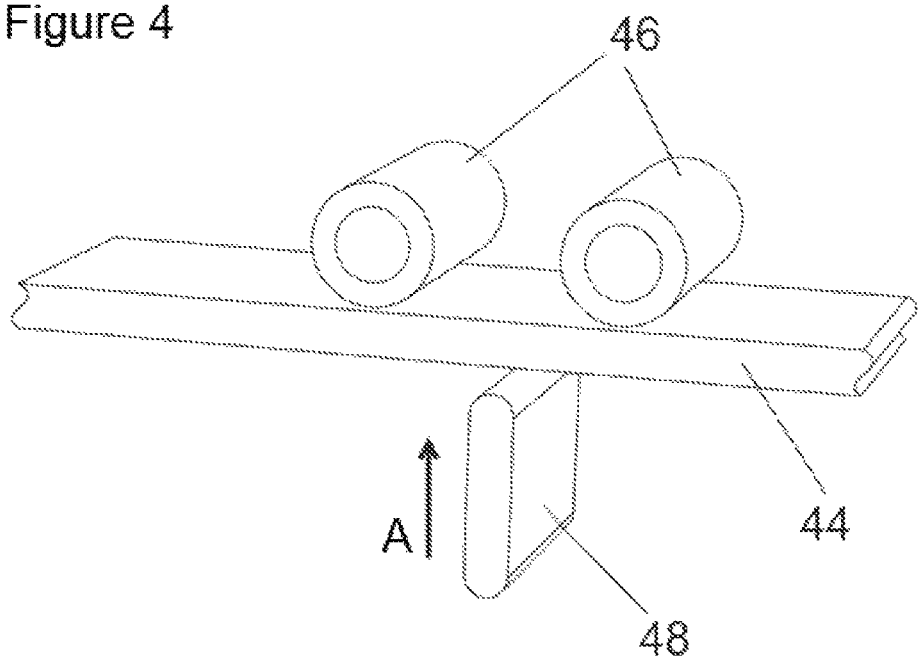
FIG. 4 is a perspective view of an exemplary strap-tensioning system, showing a strap under no tension, according to the invention.
Figure 5:
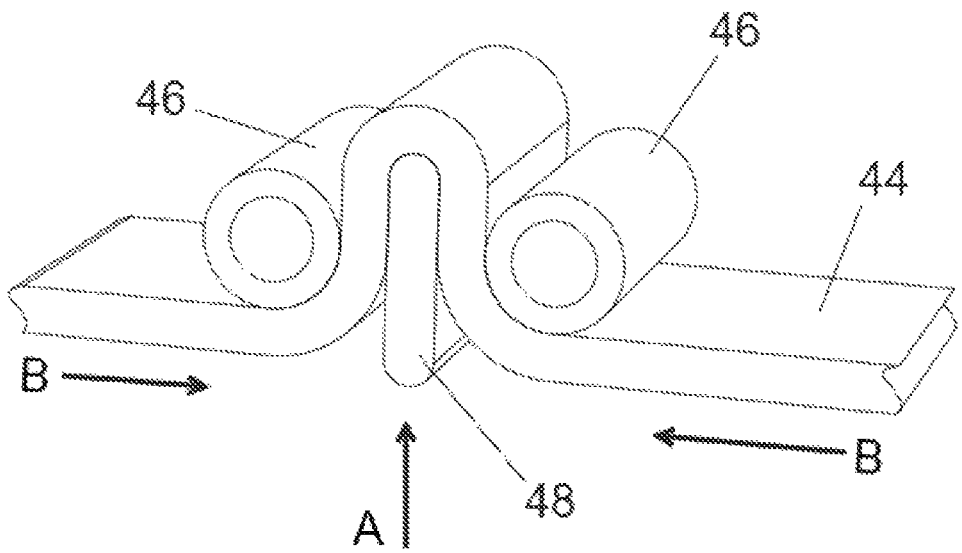
FIG. 5 is a perspective view of an exemplary strap-tensioning system, showing a strap under tension, according to the invention.

Even though the details of tensioning assembly are not immediately relevant to the present invention, an example of one such tensioning system is shown in FIGS. 4 and 5. Referring to FIG. 4, an exemplary strap 44 is positioned between two rollers 46 on one side and a ram component 48. As shown in FIG. 4, ram 48 is positioned between rollers 46 and is vertically displaceable a predetermined distance using a suitable drive mechanism, not shown. In this exemplary tensioning assembly, strap 44, which is not under tension in FIG. 4, represents the connected opposing ends of left strap 14 and right strap 16. When the drive mechanism (not shown) is activated, following this example, ram 48 will be displaced upwards (as illustrated by arrow A) forcing a portion of strap 44 to deform between the upper portion of ram 48 and against rollers 46. When this happens, strap 44 will move along arrows B, resulting in tension within the length of strap 44. In other words, when activated, strap 44 will tighten a predetermined amount against the user's head.

Figure 3:
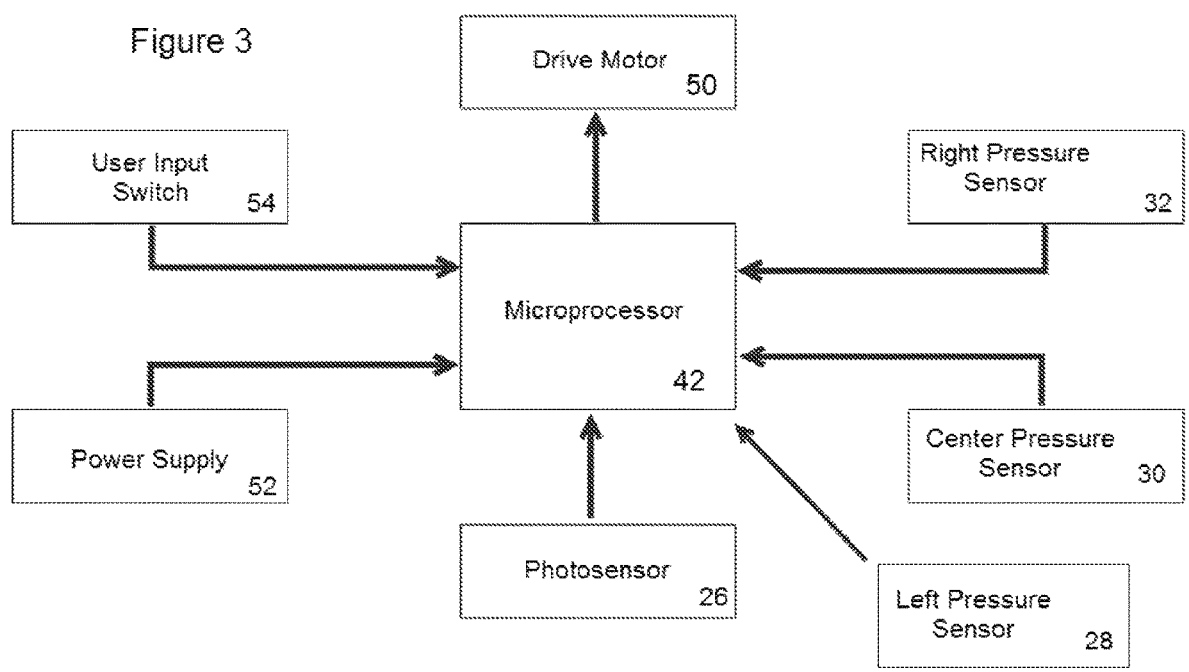
FIG. 3 is a system schematic, showing the connectivity of the various components used in accordance with the present invention.

Referring now to FIG. 3, a system schematic of the present invention is shown, including microprocessor 42, a drive motor 50, photosensor 26, a left side pressure sensor 28, a central pressure sensor 30, and a right side pressure sensor 32, a power supply 52, and a user input switch 54. As shown in the figure, sensors 28, 30 and 32 are connected to microprocessor 42 so that the microprocessor can read the pressure information from each sensor, when needed. Similarly, photosensor 26 is electrically connected to microprocessor 42 so that data related to the amount of light reaching photosensor 26 can be read by the microprocessor. User input switch 54 may be any of several different types of switches, including a movement switch, such as the output of a gyro circuit (the same one typically used in the VR system), an accelerometer switch, a simple inertia switch (wherein a small mass is supported by a spring and motion causes the mass to move and close an adjacent circuit), a membrane type switch, a simple toggle type switch, or a capacitive "touch" sensitive type switch. The function of user input switch 54 is to instruct microprocessor to initiate strap tensioning, when activated, as described below.

Finally, drive motor 50 is connected to and controlled by microprocessor 42. As mentioned above, drive motor 50 represents any of many different types of electro-motive devices, including, but not limited to, a servo motor, a motor with a gear transmission, an electromagnetic linear drive, a solenoid, or any appropriate powered drive mechanism. Whichever type is used, it would be connected to and powered by power supply 52, but controlled by microprocessor 42. Microprocessor 42 may be the same one used to control the operation of the VR system, or may be a separate one that is dedicated to strap-tensioning, according to the present invention. Regardless, when power supply 52 is turned on, microprocessor 42 will continuously interrogate pressure sensors 28, 30, and 32, as well as photosensor 26 and user input switch 54. Applicant has recognized an important moment in time, the moment when a user enters the virtual world from the real one. This transitional moment is relatively long and weak in effect when using prior art VR headsets because the user must first fit the headset on their head, and then must struggle with the manual tightening system until the tension on the straps is correct and the headset is properly aligned with their eyes. Applicant has effectively reduced the time of this transitional moment and strengthened its effect by allowing the user to simply hold a VR headset against their face (in the proper eye-alignment position) and let the present invention make the necessary strap-tensioning adjustments automatically. The user can immediately enjoy the immersive VR experience. Since the transition period between the real and virtual world is essentially instant (when the user first dons the VR headset), the immersive effect will be that more powerful and meaningful. With the present invention, entering the virtual world is quick, like turning on a switch.

According to a first embodiment of the present invention, when a user first places VR headset 10 so rim 24 presses against the user's face, pressure sensors 28, 30, 32 will sense pressure. The user can press VR headset 10 against his or her face, applying a desired force (a force equal to how tight the user wants their VR headset to be when worn). The resulting pressure will be measured by sensors 28, 30, and 32 and this information is read by microprocessor 42. According to this use-embodiment, photosensor 26 will measure no light since the headset is being pushed against the user's face, blocking any ambient light. Straps 14, 16 and 18 are roughly adjusted to loosely fit the user's head and are located around the user's head. In this embodiment, when the power to the VR display 12 is turned on, microprocessor 42 detects this and further confirms that photo-sensor 26 detects no light and that pressure sensors 28, 30, and 32 are indicating a positive pressure. If the inputs hold true, as required in this embodiment, then microprocessor 42 instructs drive motor 50 to activate, which tightens straps 14, 16, and 18. Drive motor 50 will continue to tighten the straps until pressure sensors 28, 30 and 32 show an increase in pressure. At which point, microprocessor 42 will stop drive motor. When tensioning is complete, microprocessor 42 may activate a sound or a vibration (using a sound and/or vibration generator—not shown), or do nothing.

Microprocessor 42 may also, or in place of the sound and/or the vibration, simply cause the VR display 12 to activate so that the user will see light from the display. By automatically tightening the straps, the present invention allows the user to feel like he or she is being drawn into the virtual world since the transition will be quick and easy. The illusion of entering a new world will be more powerful since the user only has to slip on the headset to "fall" into the virtual world, instead of prior art systems where the user has to first struggle by manually tightening straps. It provides a single step into the virtual world.

According to another feature of the present invention, once the straps are tightened, the user may adjust or fine-tune the tension of the straps by using user input switch 54. This could include activating a switch located on the tensioning assembly 20 (not shown). Microprocessor 42 will "read" the switch output, indicating commands by the user and will activate drive motor 50 to either tighten or loosen the straps accordingly.

According to a second embodiment of the present invention, a user holds VR headset 10 against his or her face, with straps 14, 16, and 18 loosely in place around the user's head, and simply says the word "tighten" (or any other pre-coded word).

Microprocessor 42 will read the audio input through a microphone and input circuit (not shown) and will compare the audio input word to a stored command word. If there is a match, microprocessor 42 instructs drive motor 50 to activate, which tightens straps 14, 16, and 18. In this embodiment, drive motor 50 will continue to tighten the straps until pressure sensors 28, 30 and 32 measures a predetermined pressure, a point that will indicate that the straps are just beginning to tighten around the user's head. The user then must use user input switch 54 to instruct microprocessor to tighten or loosen the straps. For safety, microprocessor 42 will only tighten straps in preset small increments of tension. Microprocessor 42 will use the measured pressure at pressure sensors 28, 30 and 32 as feedback to help control the tensioning of straps 14, 16 and 18. Also, a spring or elastic (not shown) may be included within the straps so that the maximum tension applied to the straps is limited to the preset tension of the spring or elastic.

What is claimed is:

1. A system for automatically tightening head-worn electronic gear onto a user's head, the gear having at least one electronic component and a head-contacting element that is meant to be secured around said user's head prior to use, said head-contacting element being transformable between a loosened orientation, wherein said head-contacting element is loose about said user's head, and a tightened orientation, wherein said head-contacting element is tight about said user's head, said head-contacting element being attached to said at least one electronic component, said system comprising:
   a drive mechanism being attached to said head-contacting element for selectively transforming said head-contacting element between said loosened orientation and said tightened orientation;
   a battery for powering said drive mechanism; and
   a switch for activating said drive mechanism.

2. The automatic tightening system, according to claim 1, wherein said switch is adapted to be activated by said user.

3. The automatic tightening system, according to claim 1, wherein said drive mechanism transforms said head-contacting element a limited and predetermined amount when activated.

4. The automatic tightening system, according to claim 1, further comprising at least one pressure sensor for sensing contact pressure between said head-contacting element and said user's head, said at least one pressure sensor generating a pressure value.

5. The automatic tightening system, according to claim 4, further comprising a computer for controlling said switch and the operation of said drive mechanism in response to said generated pressure value.

6. The automatic tightening system, according to claim 5, wherein said computer activates said switch to tighten said head-contacting element until said generated pressure signal equals a predetermined value.

7. The automatic tightening system, according to claim 1, wherein said switch is activated automatically, in response to an operation of said at least one electronic component.

8. A system for automatically tightening head-worn virtual reality goggles onto a user's head, said goggles having a display, a battery, a computer, and a head-contacting element that is meant to be secured around said user's head prior to use, said head-contacting element being transformable between a loosened orientation, wherein said head-contacting element is loose about said user's head, and a tightened orientation, wherein said head-contacting element is tight about said user's head, said system comprising:
   a drive mechanism being attached to said head-contacting element for selectively transforming said head-contacting element between said loosened orientation and said tightened orientation; and
   a computer for controlling said drive mechanism, said computer activating said drive mechanism in response to receiving an activation signal.

9. The system according to claim 8, wherein said user generates said activation signal.

10. The system according to claim 8, further comprising a first sensor positioned to detect if said goggles are positioned on said user's head, and a pressure sensor, positioned to measure the contact pressure between said head-contacting element and said user's head.

11. The system according to claim 10, wherein said activation signal is generated in response to predetermined output signals from said pressure sensor and said photosensor.

12. The system, according to claim 8, wherein said activation signal is generated in response to select voice commands from said user.

13. The system, according to claim 8, wherein said drive mechanism transforms said head-contacting element a limited and predetermined amount when activated.

14. The system, according to claim 10, wherein said drive mechanism tightens said head-contacting elements until a predetermined contact pressure is measured by said pressure sensor.

15. The system, according to claim 14, wherein said display of said virtual reality goggles is automatically activated when said predetermined contact pressure is measured by said pressure sensor.

16. A method for securing a virtual reality headset onto a user's head, said headset including a display, a battery, a computer, a strap for holding said headset to said user's head, and a drive mechanism for automatically tightening said strap to said user's head, said method comprising the steps of:

positioning, by said user, said goggles against said user's face; and activating said drive mechanism to automatically tighten said strap to said user's head, said activation step being automatic in response to said positioning step.

17. The method of claim 16, further comprising the step of: activating, by said user, said drive mechanism to loosen said strap about said user's head.

18. The method of claim 16, wherein said activating step being in response to said activation of said display.

19. The method of claim 16, further comprising, after said activating step, the step of: alerting said user in response to said strap becoming fully tight.

20. The method of claim 19, wherein said alerting step includes generating a sound.

\* \* \* \* \*